United States Patent
Tseng et al.

(10) Patent No.: US 10,909,431 B2
(45) Date of Patent: Feb. 2, 2021

(54) METHOD AND SYSTEM FOR DIGITAL DIRECT IMAGING, IMAGE GENERATING METHOD AND ELECTRONIC DEVICE

(71) Applicant: Industrial Technology Research Institute, Hsinchu (TW)

(72) Inventors: Shau-Yin Tseng, Hsinchu County (TW); Chien-Hung Lin, Hsinchu County (TW); Yu-Sheng Lee, Kaohsiung (TW); Yung-Chao Chen, Taichung (TW); Chih-Wei Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 136 days.

(21) Appl. No.: 16/120,467

(22) Filed: Sep. 4, 2018

(65) Prior Publication Data
US 2019/0197374 A1    Jun. 27, 2019

(30) Foreign Application Priority Data

Dec. 27, 2017 (TW) .............................. 106145935 A

(51) Int. Cl.
G06K 15/00 (2006.01)
H04N 1/32 (2006.01)
G06K 15/02 (2006.01)

(52) U.S. Cl.
CPC ..... *G06K 15/4045* (2013.01); *G06K 15/1836* (2013.01); *G06K 15/1838* (2013.01);
(Continued)

(58) Field of Classification Search
CPC ........... G06K 15/4045; G06K 15/1836; G06K 15/1838; G06K 15/1843; G06K 15/1849; G06K 15/1851; H04N 1/32251
(Continued)

(56) References Cited

U.S. PATENT DOCUMENTS

| | | |
|---|---|---|
| 4,626,838 A | 12/1986 | Tsujioka et al. |
| 4,745,575 A | 5/1988 | Hawes |

(Continued)

FOREIGN PATENT DOCUMENTS

| | | |
|---|---|---|
| CN | 101826127 | 9/2010 |
| CN | 103605264 | 2/2014 |

(Continued)

OTHER PUBLICATIONS

Zwiers, "Disrupting PCB Imaging with Inkjet Technology: Challenges & Opportunities Explained," PCB007, Sep. 24, 2014.
(Continued)

*Primary Examiner* — Suresh Memula
(74) *Attorney, Agent, or Firm* — JCIPRNET

(57) ABSTRACT

A method and a system for digital direct imaging, an image generating method and an electronic device are provided. The method for digital direct imaging includes: obtaining a first image of a first format; converting the first image into a second image of a second format, wherein the second image includes a contour description; generating a correction parameter according to at least one mark on a substrate; correcting the second image according to the contour description and the correction parameter; and performing a rasterization operation on the corrected second image and imaging the second image processed by the rasterization operation on the substrate by an exposure device.

22 Claims, 12 Drawing Sheets

(52) U.S. Cl.
CPC ..... *G06K 15/1843* (2013.01); *G06K 15/1849* (2013.01); *G06K 15/1851* (2013.01); *H04N 1/32251* (2013.01)

(58) Field of Classification Search
USPC ........................................................ 716/137
See application file for complete search history.

(56) References Cited

U.S. PATENT DOCUMENTS

| | | | |
|---|---|---|---|
| 4,998,211 | A | 3/1991 | Hamada et al. |
| 5,553,219 | A | 9/1996 | Kurashige |
| 6,262,818 | B1 | 7/2001 | Cuche et al. |
| 7,006,094 | B2 | 2/2006 | Kejser et al. |
| 7,050,653 | B2 * | 5/2006 | Edso ............ G06F 3/03545 324/307 |
| 7,930,653 | B2 * | 4/2011 | Ivansen .............. B82Y 10/00 716/50 |
| 2005/0186692 | A1 * | 8/2005 | Olsson ........... G03F 7/70283 438/16 |
| 2008/0127031 | A1 * | 5/2008 | Olsson ........... G03F 7/70283 716/54 |
| 2008/0144942 | A1 * | 6/2008 | Besley ............... G06K 9/6204 382/209 |
| 2008/0270753 | A1 | 10/2008 | Achiwa et al. |
| 2011/0090220 | A1 | 4/2011 | Molnar et al. |
| 2013/0055173 | A1 | 2/2013 | Wang et al. |
| 2013/0294692 | A1 * | 11/2013 | Koziarz ................. G06T 9/20 382/173 |
| 2014/0007033 | A1 * | 1/2014 | Kitamura ............ G06F 30/398 716/112 |
| 2015/0362834 | A1 * | 12/2015 | Choi ..................... G03F 1/78 716/53 |

FOREIGN PATENT DOCUMENTS

| | | |
|---|---|---|
| CN | 104408759 | 3/2015 |
| CN | 105143985 | 12/2015 |
| CN | 106462049 | 2/2017 |
| TW | 400457 | 8/2000 |
| TW | 201316130 | 4/2013 |
| TW | I472940 | 2/2015 |
| TW | 201543865 | 11/2015 |
| TW | 201730689 | 9/2017 |

OTHER PUBLICATIONS

Menon, et al., "Maskless lithography," Materials Today, Feb. 2005, pp. 26-33.
Barbucha et al, "Laser direct imaging of the printed electrical circuits on PCB," SPIE, Sep. 2005, pp. 1-8.
Barbucha et al, "Laser Direct Imaging of tracks on PCB covered with laser photoresist," Technical Sciences, Mar. 2008, pp. 17-20.
Waldbaur, et al, "Maskless projection lithography for the fast and flexible generation of grayscale protein patterns," Small , Mar. 13, 2012, pp. 1570-1578.
"Office Action of Taiwan Counterpart Application", dated Jul. 3, 2018, p. 1-p. 4.
"Office Action of China Counterpart Application", dated Jun. 3, 2020, p. 1-p. 8.

* cited by examiner

| 64x64 block 1 | 64x64 block 2 | 64x64 block 3 | 64x64 block 4 | . . . . . . | 64x64 block 16 |
|---|---|---|---|---|---|
| 64x64 block 17 | 64x64 block 18 | 64x64 block 19 | 64x64 block 20 | . . . . . . | 64x64 block 32 |
| | | | | | |
| 64x64 block 16n+1 | 64x64 block 16n+2 | 64x64 block 16n+3 | 64x64 block 16n+4 | . . . . . . | 64x64 block 16n+16 |

FIG. 1C

METHOD AND SYSTEM FOR DIGITAL DIRECT IMAGING, IMAGE GENERATING METHOD AND ELECTRONIC DEVICE

CROSS-REFERENCE TO RELATED APPLICATION

This application claims the priority benefit of Taiwan application serial no. 106145935, filed on Dec. 27, 2017. The entirety of the above-mentioned patent application is hereby incorporated by reference herein and made a part of this specification.

BACKGROUND

Technical Field

The disclosure relates to a method and a system for digital direct imaging, a rasterized image generating method and an electronic device.

Description of Related Art

Maskless lithography (ML2) is a technology that adopts direct imaging (DI) without using a conventional mask and is applicable to printed circuit board (PCB) manufacturing. With the increasing demand for image quality, new techniques such as laser direct imaging (LDI) and a digital micromirror device (DMD) are also applied to maskless lithography technology. In the current field of PCB, LDI or DMD have already been widely used as exposure devices for precision products such as substrates and flexible printed circuit boards. Since the PCB industry and the advanced packaging technologies continuously encounter challenges brought about by the trend toward slimness and lightness, it is also necessary to attain more subtle patterns and structures, achieve good alignment by use of marks and enhance the production yield.

It should be noted that, in the current data processing applied to exposure devices for maskless lithography, an image file is generally used as the basic format. However, as the industry enters the era of high precision technology, with the resolution increased tenfold and the image expanded 100 times, several issues also occur simultaneously such as (1) computing load in a workstation for image rasterization (such as a raster image processing (RIP) workstation); (2) high-resolution real-time geometric scaling/rotation correction; and (3) transmission and storage of enormous data.

SUMMARY

The disclosure provides a method and a system for digital direct imaging, a rasterized image generating method and an electronic device, which may reduce the computing load in the RIP workstation, facilitate high-resolution real-time geometric scaling/rotation correction, and solve the issue of transmission and storage of enolinnous data.

The disclosure provides a method for digital direct imaging. The method for digital direct imaging includes: obtaining a first image of a first format; converting the first image into a second image of a second format, wherein the second image includes a contour description; generating a correction parameter according to at least one mark on a substrate; correcting the second image according to the contour description and the correction parameter; and performing a rasterization operation on the corrected second image and imaging the second image processed by the rasterization operation on the substrate by an exposure device.

The disclosure provides a system for digital direct imaging. The system for digital direct imaging includes an input/output device, a processor and an exposure device. The input/output device obtains a first image of a first format. The processor converts the first image into a second image of a second format, wherein the second image comprises a contour description. The processor generates a correction parameter according to at least one mark on a substrate. The processor corrects the second image according to the contour description and the correction parameter, and performs a rasterization operation on the corrected second image. The exposure device images the second image processed by the rasterization operation on the substrate.

The disclosure provides a rasterized image generating method adapted for an electronic device having a first register, a second register and a processor. The rasterized image generating method includes: by the first register, using a first mark to mark a first image unit located on a bottom portion contour of a geometric shape in a first block among a plurality of blocks; by the first register, using a second mark to mark a second image unit located on an upper portion contour of the geometric shape; by the second register, using a third mark to mark a third image unit located between the bottom portion contour and the upper portion contour in the geometric shape; and by the processor, combining the marked first image unit, the already marked second image unit and the marked third image unit so as to generate a first output image and output the first output image.

The disclosure provides an electronic device, including a first register, a second register and a processor. The first register uses a first mark to mark a first image unit located on a bottom portion contour of a geometric shape in a first block among a plurality of blocks. The first register uses a second mark to mark a second image unit located on an upper portion contour of the geometric shape. The second register uses a third mark to mark a third image unit located between the bottom portion contour and the upper portion contour in the geometric shape. The processor combines the marked first image unit, the marked second image unit and the marked third image unit so as to generate a first output image and output the first output image.

The disclosure provides a rasterized image generating method adapted for an electronic device having a register and a processor. The rasterized image generating method includes: by the register, using a first mark to mark a first image unit located on a bottom portion contour of a geometric shape in a first block among a plurality of blocks; by the register, using a second mark to mark a second image unit located on an upper portion contour of the geometric shape; by the register, using a third mark to mark a third image unit located between the bottom portion contour and the upper portion contour in the geometric shape; and by the processor, combining the marked first image unit, the marked second image unit and the marked third image unit so as to generate a first output image and output the first output image.

The disclosure provides an electronic device, including a register and a processor. The register uses a first mark to mark a first image unit located on a bottom portion contour of a geometric shape in a first block among a plurality of blocks. The register uses a second mark to mark a second image unit located on an upper portion contour of the geometric shape. The register uses a third mark to mark a third image unit located between the bottom portion contour and the upper portion contour in the geometric shape. The processor combines the marked first image unit, the marked second image unit and the marked third image unit so as to generate a first output image and output the first output image.

Based on the foregoing, the method and the system for digital direct imaging, the rasterized image generating method and the electronic device provided by this disclosure may reduce the computing load in the RIP workstation, facilitate high-resolution real-time geometric scaling/rotation correction, and solve the issue of transmission and storage of enormous data.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1C is a schematic view showing an image composed of blocks each with a size of 64×64 pixels, wherein the size of the block is the same as the size of the first register 14a and the size of the second register 14b.

DESCRIPTION OF THE EMBODIMENTS

Figure 1A:
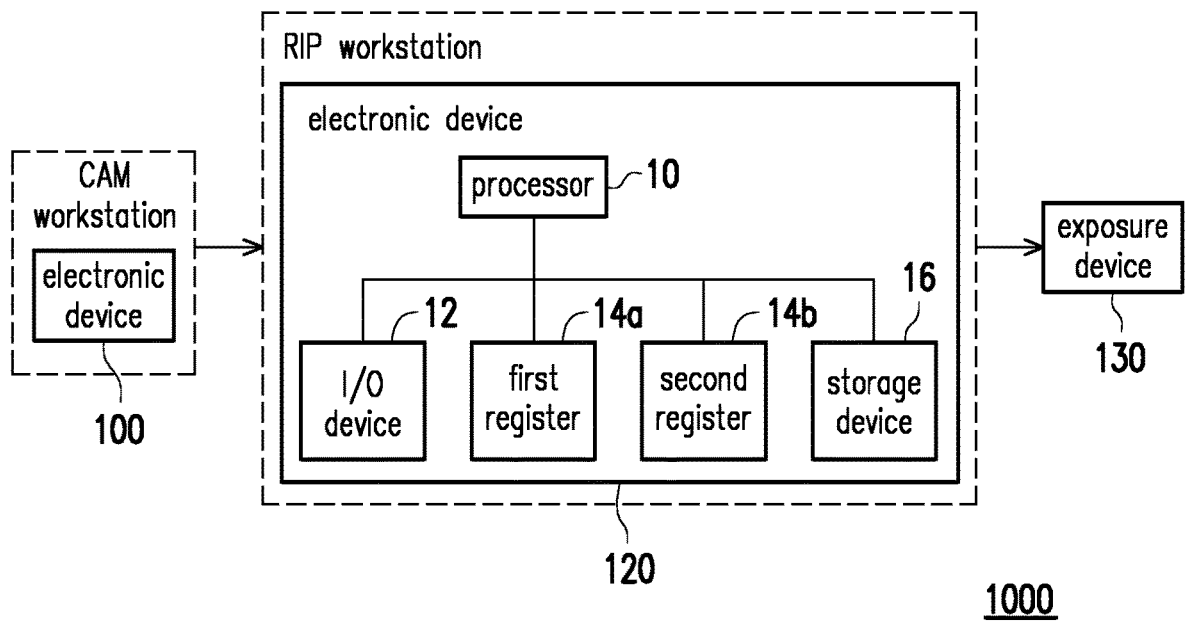
FIG. 1A is a schematic view showing a system for digital direct imaging according to an embodiment of the disclosure.

Descriptions of the disclosure are given with reference to the exemplary embodiments illustrated by the accompanying drawings. In addition, wherever possible, identical or similar reference numerals stand for identical or similar elements/components in the drawings and embodiments.

FIG. 1A is a schematic view showing a system for digital direct imaging according to an embodiment of the disclosure.

With reference to FIG. 1A, a system 1000 for digital direct imaging includes an electronic device 100 that serves as a computer aided manufacturing (CAM) workstation, an electronic device 120 that serves as a raster image processing (RIP) workstation, and an exposure device 130.

The electronic device 100 (hereinafter referred to as the CAM workstation) is, for example, an electronic device that has a processor (not illustrated) and a storage device (not illustrated) connected to the processor. The CAM workstation is, for example, an electronic device such as a mobile phone, a tablet computer, a desktop computer and a notebook computer, but is not limited thereto. In this exemplary embodiment, the storage device of the CAM workstation stores a plurality of code snippets therein. The code snippets are executed by the processor of the CAM workstation after being installed. For example, the storage device of the CAM workstation includes a plurality of modules, through which operations of the CAM workstation that are applied to the system 1000 for digital direct imaging are executed respectively, wherein each of the modules is composed of one or more code snippets. However, the disclosure is not limited thereto. Each of the operations of the CAM workstation may also be implemented in other hardware forms. Besides, the CAM workstation may also include an input/output (I/O) device (not illustrated), which may output a file to the electronic device 120 that serves as the RIP workstation.

The electronic device 120 (hereinafter referred to as the RIP workstation) is, for example, an electronic device that has a processor 10, an I/O device 12, a first register 14a, a second register 14b and a storage device 16. The RIP workstation is, for example, an electronic device such as a mobile phone, a tablet computer, a desktop computer and a notebook computer, but is not limited thereto.

The processor 10 may be a central processing unit (CPU), a programmable microprocessor for general use or special use, a digital signal processor (DSP), a programmable controller, an application specific integrated circuit (ASIC), other similar devices, or a combination of the foregoing.

The I/O device 12 is, for example, an input interface or circuit for obtaining relevant data from the CAM workstation or other sources. Besides, the I/O device 12 may transmit the data generated by the RIP workstation to an output interface or circuit of the exposure device 130 or of other electronic devices, and the disclosure is not limited thereto.

The first register 14a and the second register 14b may be any type of stationary or movable random access memory (RAM), a flip-flop, similar components, or a combination of the foregoing. In this exemplary embodiment, the first register 14a is RAM and the second register 14b is a flip-flop. However, the disclosure is not limited thereto. In one embodiment, the first register 14a and the second register 14b may also be integrated into a single register.

The storage device 16 may be any type of stationary or movable random access memory (RAM), read-only memory (ROM), flash memory, similar components, or a combination of the foregoing. Besides, in this exemplary embodiment, the storage device 16 is also used as a buffer memory.

In this exemplary embodiment, the storage device 16 of the RIP workstation stores a plurality of code snippets therein. The code snippets are executed by the processor 10 of the RIP workstation after being installed. For example, the storage device 16 of the RIP workstation includes a plurality of modules, through which operations of the RIP workstation that are applied to the system 1000 for digital direct imaging are executed respectively, wherein each of the modules is composed of one or more code snippets. However, the disclosure is not limited thereto. Each of the operations of the RIP workstation may also be implemented in other hardware forms.

The exposure device 130 may be a conventional exposure device using techniques such as laser direct imaging (LDI) or a digital micromirror device (DMD).

Figure 1B:
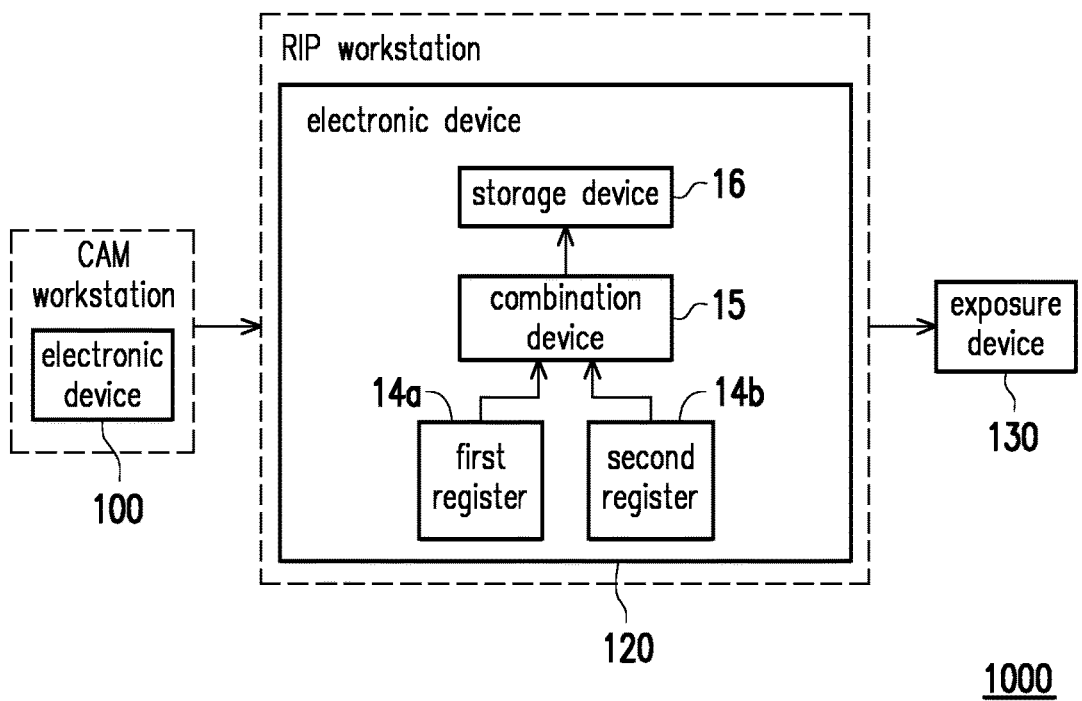
FIG. 1B is a schematic view showing the electronic device in the RIP workstation from another angle according to an embodiment of the disclosure.

Particularly, FIG. 1B is a schematic view showing the electronic device in the RIP workstation from another angle according to an embodiment of the disclosure.

With reference to FIG. 1B, the electronic device 120 in the RIP workstation, when viewed from another angle, may further include a combination device 15. The combination device 15 may be implemented by software, and the related operations of the combination device 15 are performed by the processor 10 (not illustrated in FIG. 1B). The combination device 15, for example, may receive data (such as images) from the first register 14a and/or the second register 14b, and may integrate (or combine) the data from the first register 14a and/or the data from the second register 14b. Then, the combination device 15 may transmit the integrated data to the storage device 16 for temporary storage, and the exposure device 130 may obtain the integrated data from the storage device 16 and image an image on a substrate. However, it should be noted that the combination device 15 may also be a related circuit implemented by hardware, and the disclosure is not limited thereto.

FIG. 1C is a schematic view showing an image composed of blocks each with a size of 64×64 pixels, wherein the size of the block is the same as the size of the first register 14a and the size of the second register 14b.

With reference to FIG. 1C, FIG. 1C shows a large image composed of blocks each with a size of 64×64 pixels, wherein the size of the block is the same as the size of the first register 14a and the size of the second register 14b. Before each block is written for the first time, the first register 14a and the second register 14b need to be initialized first in order to clear the contents thereof to zero. The initialization may be carried out by performing the operation of zero filling before the contents of the first register 14a and the second register 14b are written. For example, when the combined image is moved to the buffer memory, the operation of clearing the contents to zero may be performed simultaneously so as to enhance performance. However, the initialization is not limited thereto. The first initialization of the first register 14a and the second register 14b may be performed by conventional methods such as performing the initialization to zero by software.

Figure 2:
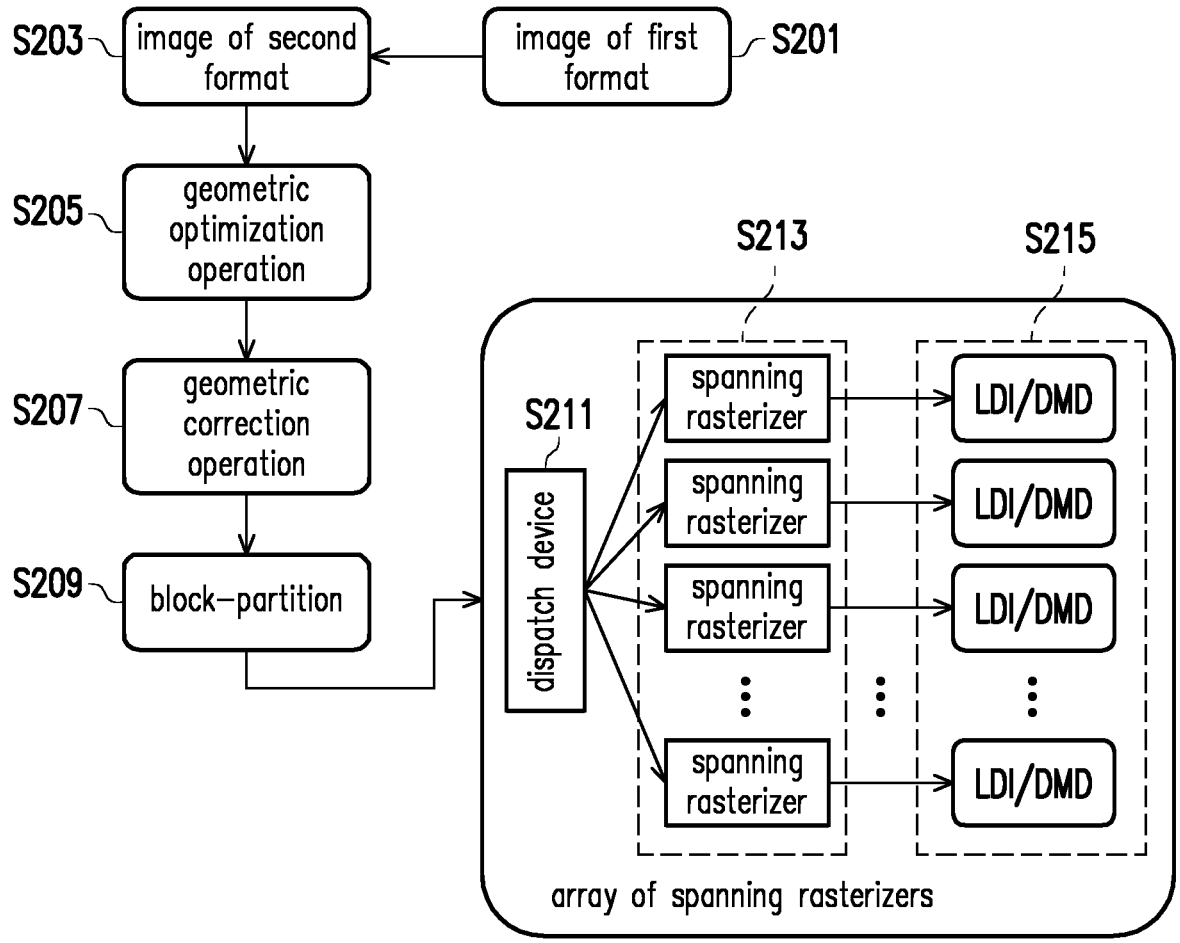
FIG. 2 is a schematic flowchart showing an operating process of the system for digital direct imaging according to an embodiment of the disclosure.

FIG. 2 is a schematic flowchart showing an operating process of the system for digital direct imaging according to an embodiment of the disclosure.

With reference to FIG. 2, first of all, the CAM workstation outputs an image of a first format (also called a first image) to the RIP workstation (step S201). In one embodiment, the first format may be a Gerber file format, which is a two-dimensional vector image file format used to describe a standard format of a printed circuit board image, e.g., a copper layer, a solder mask, a legend, a silk and so on. Particularly, if the format of an image file is a Gerber file format, the image file may include a description used to describe a graphic in the image. For example, if the format of an image file is a Gerber file format and the image includes a rectangle, the image file may include a description used to describe the rectangle. Such description, for example, includes the length, width and center position of the rectangle.

Afterwards, the RIP workstation may obtain the first image from the CAM workstation and convert the first image into an image of a second format (also called a second image) (step S203). The second image includes a contour description, which is used to describe the contour of a geometric shape in the second image, e.g., information such as the position of a pixel on the contour of the geometric shape in the second image. Consequently, the second format may also be called a "contour description format." Particularly, the usual processing method in conventional techniques is to first convert a vector-based Gerber file format into a pixel-based bitmap image format. However, this method usually results in computing overload of the RIP workstation and the issue of transmission and storage of enormous data. Consequently, since the processing method in this disclosure is to first convert the vector-based image of the first format (such as an image of the Gerber file format) into a polygon-based contour description format, the computing load in the RIP workstation may be reduced and the issue of transmission and storage of enormous data may be solved.

Then, the RIP workstation may perform a geometric optimization operation (step S205). In this exemplary embodiment, the geometric optimization operation is mainly used to demarcate an overlapping area of a plurality of geometric shapes in the second image into a single geometric shape, so as to prevent the overlapping area from being repeatedly drawn (or imaged) in the subsequent drawing (or imaging). In other words, if two geometric shapes overlap with each other, the overlapping (or intersecting) area is demarcated into one geometric shape only so as to prevent the overlapping (or intersecting) area from being repeatedly processed. It should be noted that the geometric optimization operation in step S205 is optional. In other words, in another embodiment, the RIP workstation may also not perform the geometric optimization operation.

Then, the RIP workstation may perform a geometric correction operation (step S207). In one embodiment, the geometric correction operation may include a reference frame transform operation. In detail, in one embodiment, in performing the reference frame transform operation, the RIP workstation may rotate the second image first in order to conform to a scanning angle of the exposure device 130 (such as the angle of a laser) in the subsequent exposure. However, it should be noted that in other embodiments, the RIP workstation, when performing the reference frame transform operation, may also not rotate the second image. The disclosure does not set any limit on the reference frame transform operation. Besides, in this exemplary embodiment, in performing the reference frame transform operation, the RIP workstation may perform primitive partition on the geometric shapes in the second image. In detail, the RIP workstation obtains the plurality of geometric shapes (also called first geometric shapes) in the second image from the contour description of the second image, and performs partition on the first geometric shapes to generate a plurality of geometric shapes (also called second geometric shapes). It should be noted that the purpose of primitive partition is to cut the originally complex first geometric shape into a smaller shape and to show the shape in primitive geometric shape grids instead. Afterwards, the RIP workstation may store at least one reference point on the contour of the partitioned second geometric shapes in the storage device 16 of the RIP workstation, for example. It should be noted here that in this exemplary embodiment, since the RIP workstation only stores a portion of the reference points located on the contour of the geometric shape instead of storing all of the pixel points inside the entire geometric shape as in the case of a bitmap image format, the computing load in the RIP workstation may be reduced and the issue of transmission and storage of enormous data may be solved.

Figure 3A:
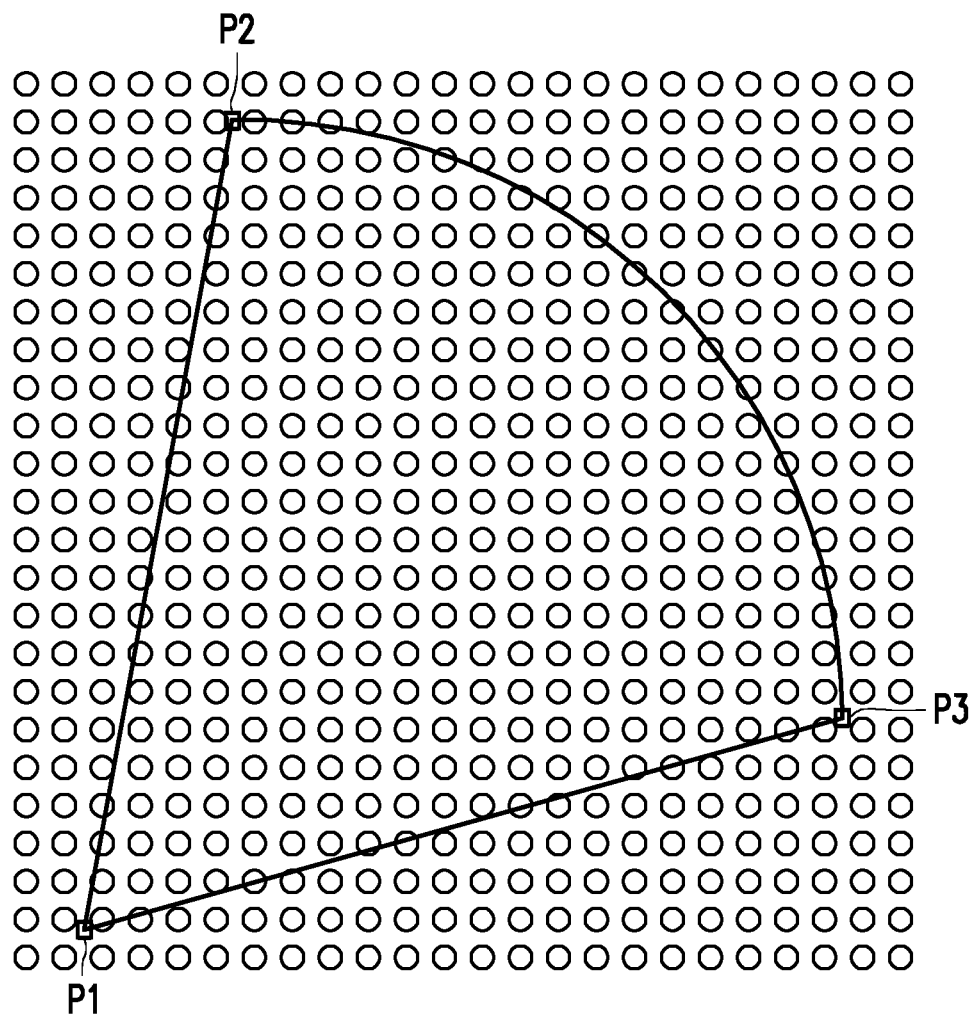
FIG. 3A is a schematic view showing the stored reference points on the contour of a geometric shape according to an embodiment of the disclosure.

For example, FIG. 3A is a schematic view showing the stored reference points on the contour of a geometric shape according to an embodiment of the disclosure.

With reference to FIG. 3A, it is assumed that pixel points P1-P3 and connecting lines between any two of the pixel points P1-P3 in FIG. 3A may form the contour of a geometric shape among the plurality of second geometric shapes. The RIP workstation may use the pixel points P1-P3 as reference points and store the pixel points P1-P3 in the storage device 16. In this way, the computing load in the RIP workstation may be reduced and the issue of transmission and storage of enormous data may be solved.

Besides, the geometric correction operation in step S207 may also include other correction operations. In detail, when maskless lithography technology is used to directly image an image on a substrate, since the substrate may be skewed (e.g., rotated or offsetted) when placed on the machine, the RIP workstation may obtain an image (also called a third image) of the substrate placed on the exposure device first, and then determine a skewing (e.g., rotating or offsetting) degree of the substrate placed on the machine according to at least one mark originally drawn for positioning in the third image. The RIP workstation may perform the geometric correction operation according to the skewing degree as calculated so as to calculate a correction parameter. It should be noted that calculating a skewing degree according to at least one mark in the image may be known from conventional techniques and the description thereof is omitted here. After the correction parameter is calculated, the RIP workstation may rotate the second geometric shape according to the previously obtained reference points and the calculated correction parameter, so that the exposure device 130 may align the second image with the substrate during imaging.

Figure 3B:
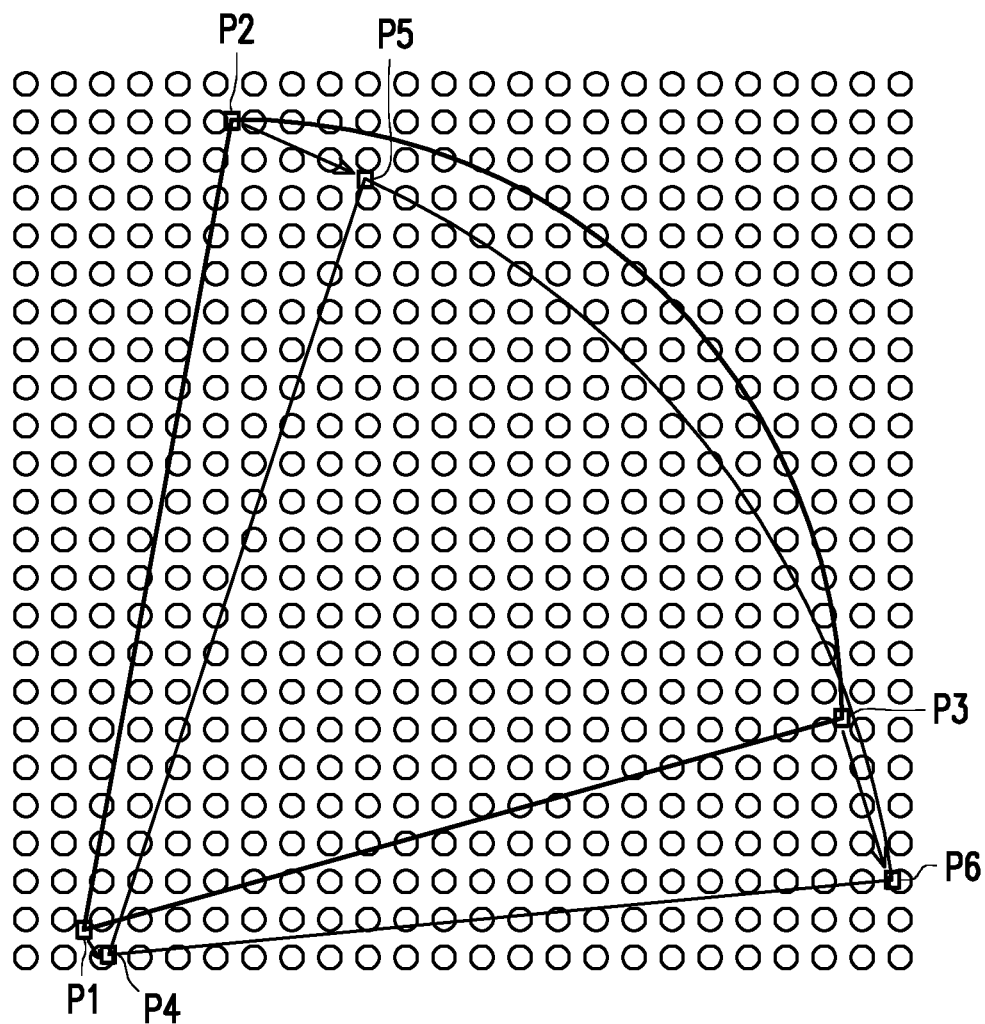
FIG. 3B and FIG. 3C are schematic views showing an example of rotating the second geometric shape according to an embodiment of the disclosure.
Figure 3C:
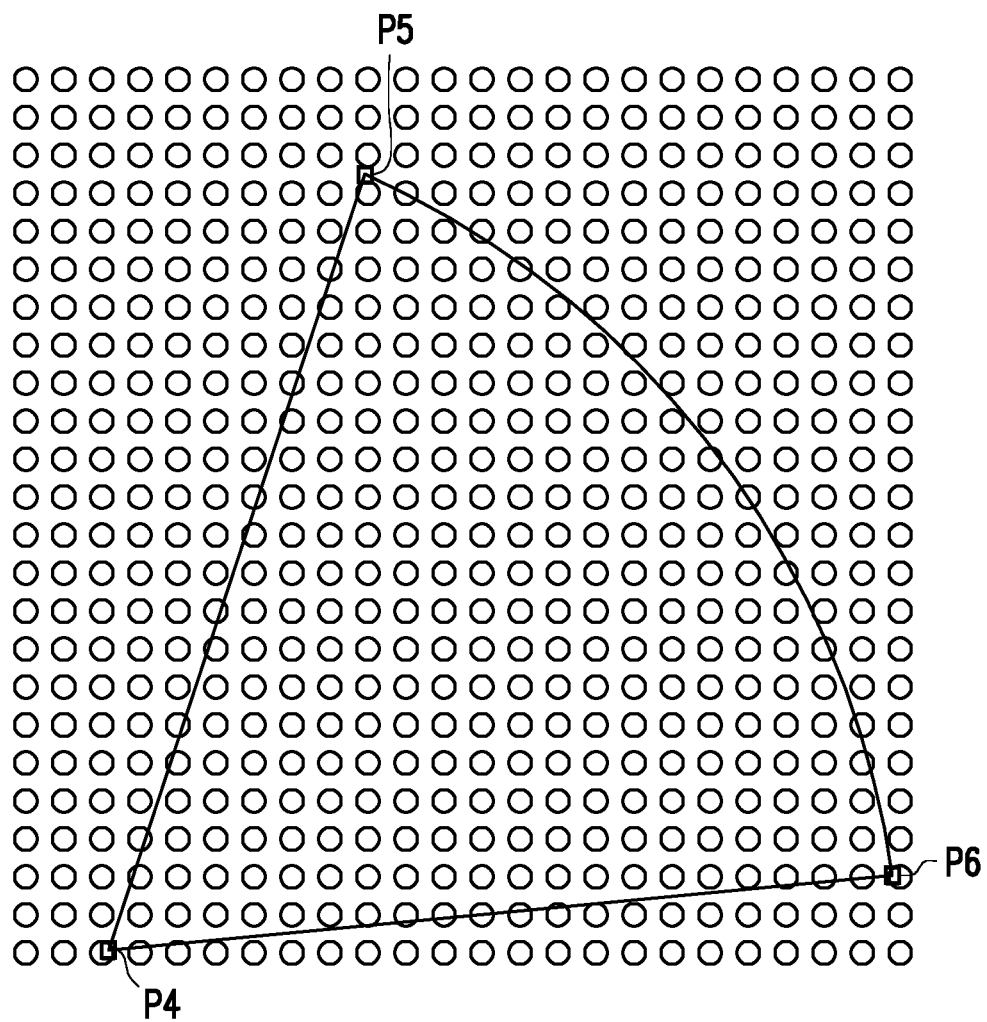

For example, FIG. 3B and FIG. 3C are schematic views showing an example of rotating the second geometric shape according to an embodiment of the disclosure. With reference to FIG. 3B, according to the reference points (i.e., the pixel points P1-P3) previously selected in FIG. 3A and the calculated correction parameter, the RIP workstation may rotate the pixel points P1-P3 in the geometric shape of FIG. 3A to the positions of the pixel points P4-P6 in FIG. 3B respectively, and the geometric shape after the rotation is as shown in FIG. 3C. In this way, the second image is made to be aligned with the substrate.

Figure 3D:
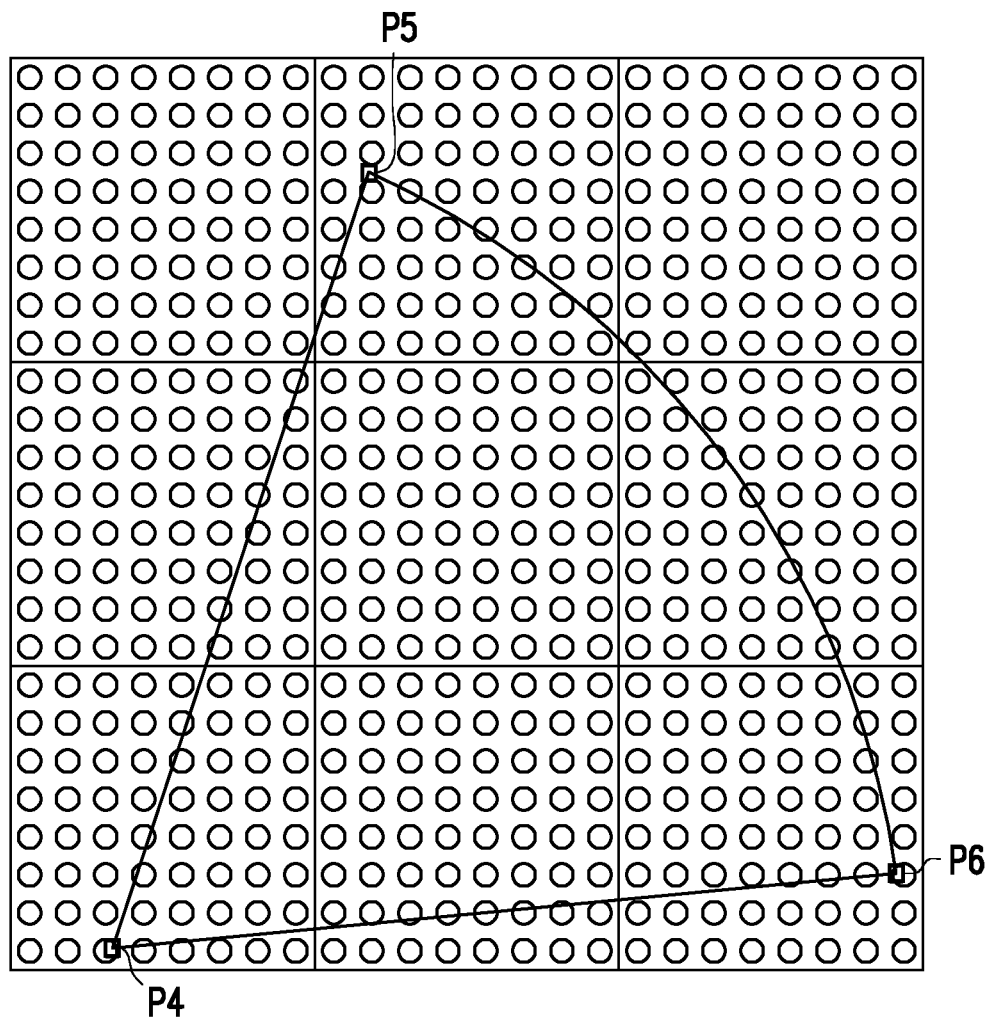
FIG. 3D is a schematic view showing an example of performing partition on the second geometric shape by a predetermined size according to an embodiment of the disclosure.

With reference to FIG. 2 again, afterwards, since an exposure head (such as a laser diode) of the exposure device 130 is designed to be obliquely placed, the RIP workstation further performs partition on the second geometric shapes by a predetermined size to generate a plurality of blocks (step S209). Specifically, since a buffer memory of a spanning rasterizer in the RIP workstation may only store (or draw) a portion of the geometric shape at a time, the plurality of blocks, which are generated after the RIP workstation performs partition on the second geometric shape, may each output the buffer memory of one or more spanning rasterizers to the exposure head of the exposure device 130, so as to conform to the scanning angle of the exposure head (such as a laser diode) of the exposure device 130. For example, FIG. 3D is a schematic view showing an example of performing partition on the second geometric shape by a predetermined size according to an embodiment of the disclosure. With reference to FIG. 3D, after rotating the pixel points P1-P3 in the geometric shape of FIG. 3A to the positions of the pixel points P4-P6 respectively, the RIP workstation may perform partition on the geometric shape in FIG. 3D by a predetermined size so as to generate nine blocks.

After the plurality of blocks are generated by partitioning the second geometric shape, each block may be assigned to one of the plurality of spanning rasterizers by means of a dispatch device implemented by program codes or by hardware in the RIP workstation (step S211). Then, the plurality of spanning rasterizers may each fill up the pixels surrounded by the contour of the geometric shape in each block (step S213).

Figure 4:
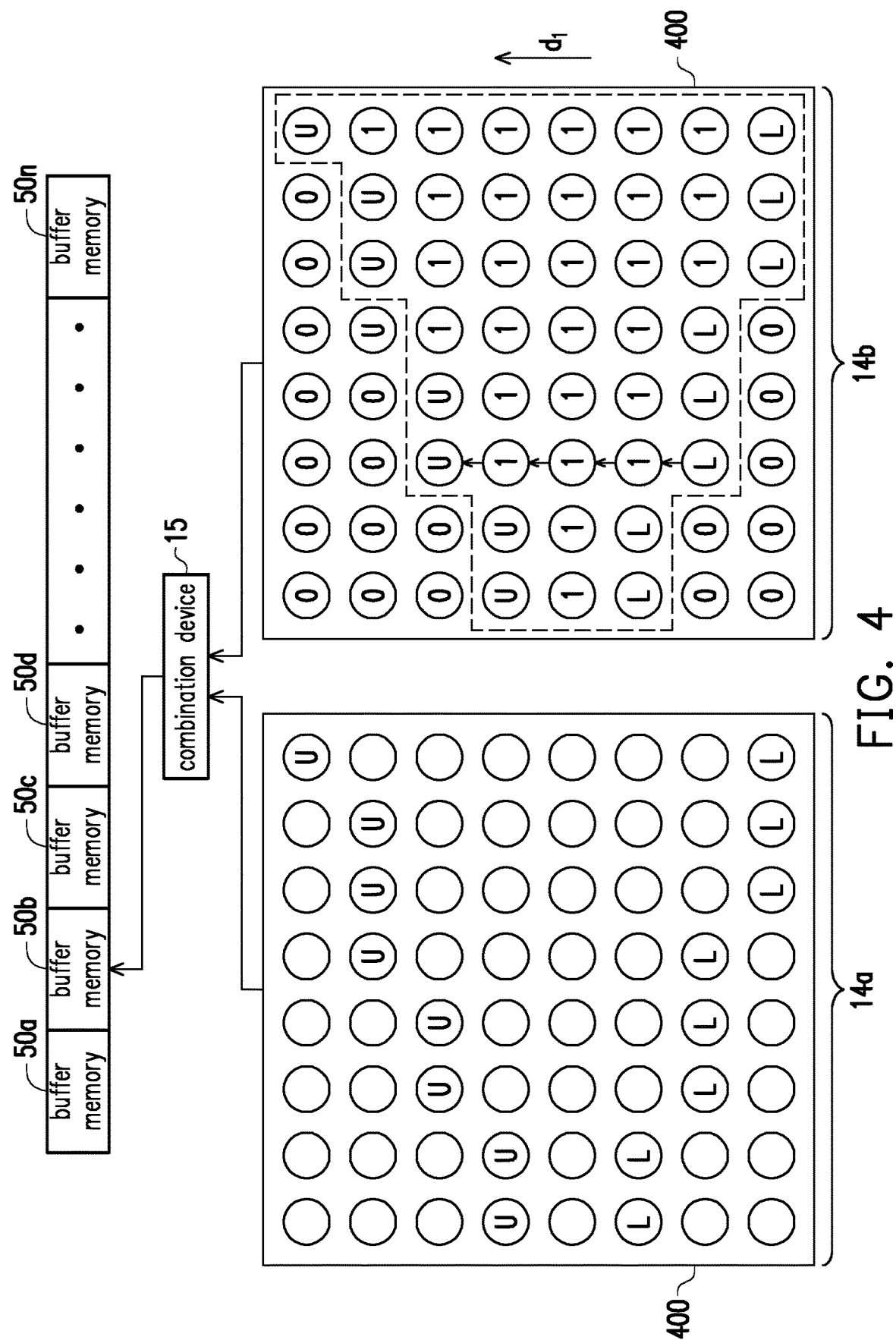
FIG. 4 is a schematic view showing an example of filling up the pixels surrounded by the contour of the geometric shape according to an embodiment of the disclosure.

In detail, FIG. 4 is a schematic view showing an example of filling up the pixels surrounded by the contour of the geometric shape according to an embodiment of the disclosure. With reference to FIG. 4, a block 400 (herein referred to as a first block) among the plurality of blocks is taken as an example here. The block 400 includes a geometric shape (herein referred to as a third geometric shape). The RIP workstation may use the first register 14a to mark pixels of a bottom portion contour and pixels of an upper portion contour in the third geometric shape (as shown by the block 400 on the left of FIG. 4). Besides, the RIP workstation may use the second register 14b to mark pixels between the bottom portion contour and the upper portion contour in the third geometric shape (as shown by the block 400 on the right of FIG. 4). More specifically, the RIP workstation, by means of the first register 14a, may use "L" (herein referred to as a first mark) to mark the pixels (also called a first image unit) located on the bottom portion contour of the third geometric shape in FIG. 4. Besides, the RIP workstation, by means of the first register 14a, may also use "U" (herein referred to as a second mark) to mark the pixels (also called a second image unit) located on the upper portion contour of the third geometric shape in FIG. 4. Then, after the pixels of the bottom portion contour and the pixels of the upper portion contour in the third geometric shape are marked, the first register 14a may output a control signal. Afterwards, the second register 14b, according to the control signal, may mark the pixels (herein referred to as a third image unit) located between the bottom portion contour and the upper portion contour in the third geometric shape as "1." For example, when a pixel is marked as "L," the second register 14b then uses this pixel marked as "L" as a starting point to mark the pixels in a vertical direction $d_1$ in FIG. 4 as "1" (herein referred to as a third mark) until reaching a pixel marked as "U" or reaching the boundary.

Afterwards, the processor 10 in the RIP workstation may combine the marked first image unit, the marked second image unit and the marked third image unit so as to generate an output image (also called a first output image). In other words, as shown in FIG. 4, after the first register 14a and the second register 14b respectively complete the operations of marking the pixels as described above, the first register 14a and the second register 14b may then respectively output the marked pixels to the combination device 15 for combining. The combination device 15 may combine the outputs from the first register 14a and the second register 14b to generate the first output image, and may store the first output image to a buffer memory 50b provided by the storage device 16, for example. In this exemplary embodiment, the storage device 16 may provide buffer memories 50a-50n, and the exposure device 130 may obtain images from the buffer memories 50a-50n and perform imaging. It should be noted that if each of the buffer memories 50a-50n may store 64×64 pixels and the number of the buffer memories 50a-50n is 16, then the number of the pixels in the same column of the array formed by the buffer memories 50a-50n is exactly equal to the length of a scan line (i.e., the length of 64×16), and the number of columns (i.e., 64) of a buffer memory is exactly equal to the number of the scan line. When each of the buffer memories 50a-50n stores an output image, the buffer memories 50a-50n store the data volume of 64 scan lines.

Figure 5:
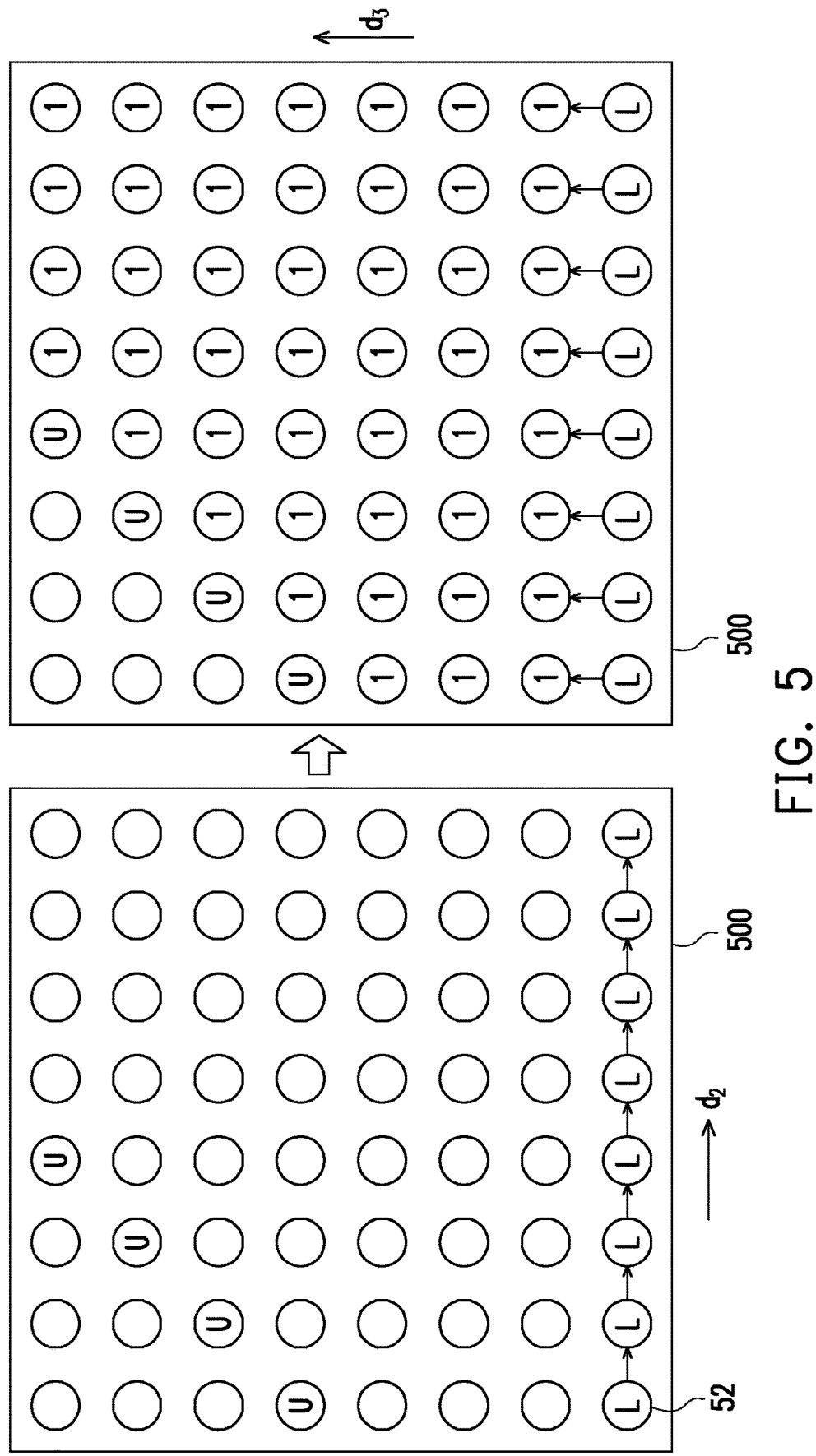
FIG. 5 is a schematic view showing an example of filling up the pixels in a block according to another embodiment of the disclosure.

However, please refer to another embodiment. FIG. 5 is a schematic view showing an example of filling up the pixels in a block according to another embodiment of the disclosure. With reference to FIG. 5, a block 500 (also called a second block) on the left of FIG. 5 is taken as an example here, and it is assumed that a first register 14a uses "U" to mark an upper portion contour of the block 500 on the left of FIG. 5. Besides, an RIP workstation, by means of the first register 14a, also uses "L" (herein referred to as a fourth mark) to mark a pixel point 52 (herein referred to as a fourth image unit) in the block 500 and outputs a plurality of control signals. Then, the RIP workstation, by means of a second register 14b, may use the fourth mark to mark the pixel points (also called a fifth image unit) located in a direction $d_2$ (also called a first direction) in the block 500 according to a control signal (herein referred to as a first control signal). In other words, the second register 14b may use the fourth mark to transversely mark the pixel points located in the same column with the pixel point 52 (as shown by the block 500 on the left of FIG. 5). Afterwards, as shown by a block 500 on the right of FIG. 5, the second register 14b, according to another control signal (herein referred to as a second control signal), may use the fifth image unit as a starting point to mark the pixels in a vertical direction $d_3$ (also called a second direction) as "l" (herein referred to as a fifth mark) until reaching the pixels marked as "U" on the upper portion of the block or reaching the boundary (herein referred to as a sixth image unit).

Afterwards, a processor 10 in the RIP workstation combines the marked fourth image unit, the marked fifth image unit and the marked sixth image unit so as to generate an output image (also called a second output image). For example, by using the method as shown in FIG. 4, the RIP workstation may combine the marked fourth image unit, the marked fifth image unit and the marked sixth image unit by means of a combination device 15 to generate the second output image, and may then output the second output image to one of the buffer memories 50a-50n.

Figure 6A:
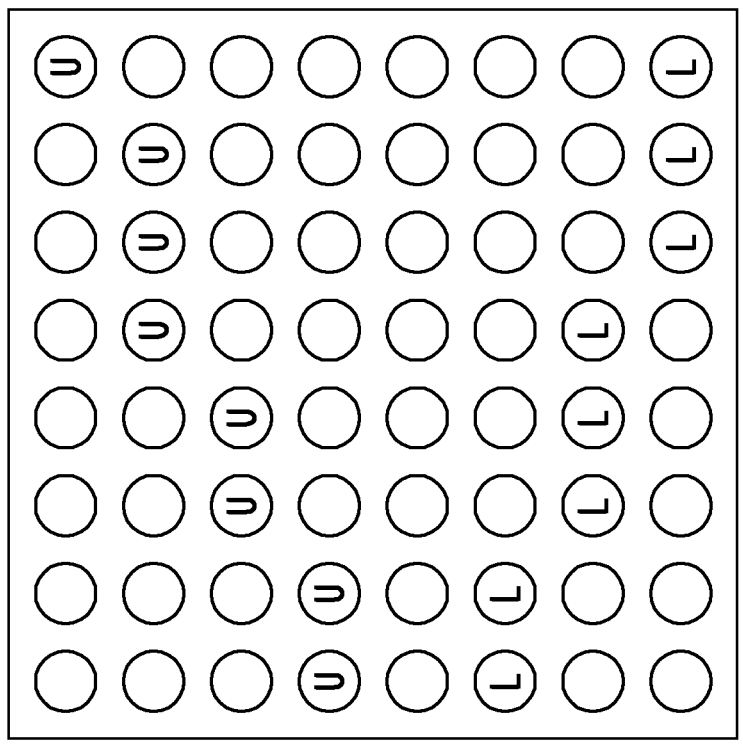
FIGS. 6A to 6C are schematic views showing an example of performing grayscale processing on the contour of a geometric shape according to another embodiment of the disclosure.
Figure 6B:
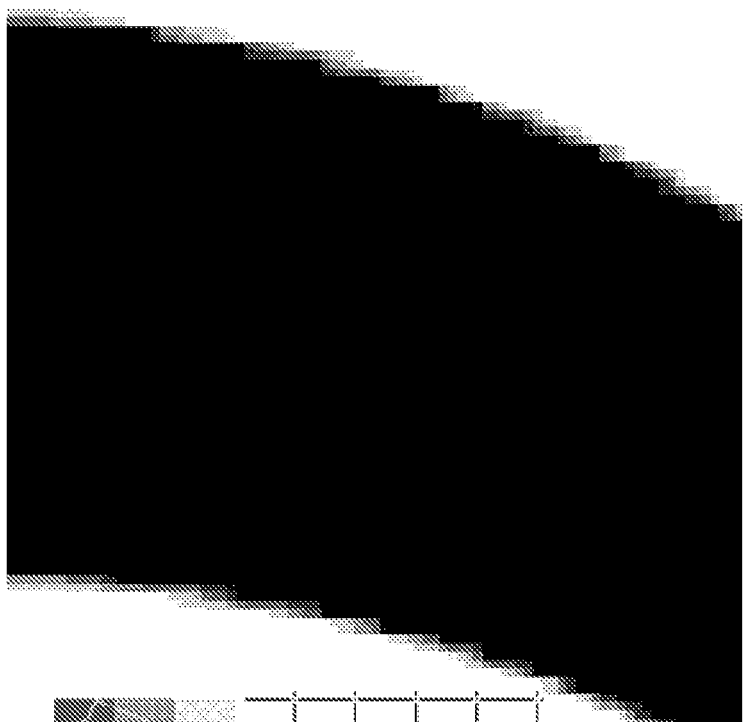
Figure 6C:
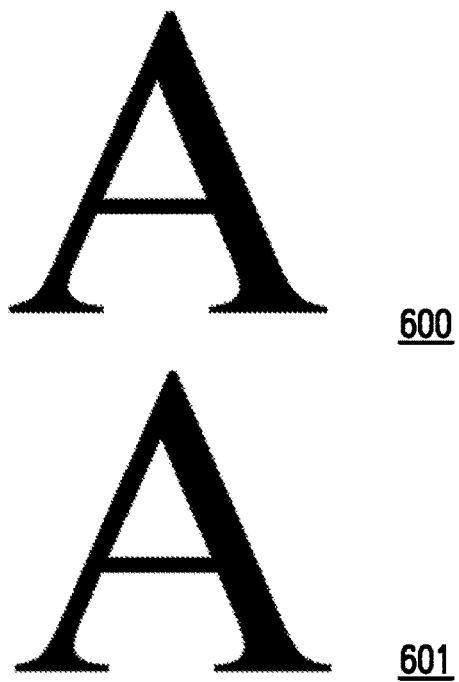

However, please refer to another embodiment. FIGS. 6A to 6C are schematic views showing an example of performing grayscale processing on the contour of a geometric shape according to another embodiment of the disclosure. With reference to FIG. 6A, which is similar to the embodiment in FIG. 4, a block 400 (herein referred to as a first block) among the plurality of blocks is taken as an example here. The block 400 includes a geometric shape (herein referred to as a third geometric shape). An RIP workstation may use a first register 14a to mark pixels of a bottom portion contour and pixels of an upper portion contour in the third geometric shape. More specifically, the RIP workstation, by means of the first register 14a, may use "L" (herein referred to as a first mark) to mark the pixels (also called a first image unit) located on the bottom portion contour of the third geometric shape in FIG. 6A. Besides, the RIP workstation, by means of the first register 14a, may also use "U" (herein referred to as a second mark) to mark the pixels (also called a second image unit) located on the upper portion contour of the third geometric shape in FIG. 6A. However, the difference is that the RIP workstation may also perform a grayscale processing operation on the first image unit and the second image unit by means of the first register 14a, as shown in FIG. 6B. The process of performing the grayscale processing operation on pixels may be known by conventional methods and the description thereof is omitted here. Afterwards, a second register 14b may mark the pixels located between the bottom portion contour and the upper portion contour in the third geometric shape as "l" (herein referred to as a third mark).

Particularly, FIG. 6C shows a schematic view after the grayscale processing operation is performed according to an embodiment of the disclosure. With reference to FIG. 6C, a letter 600 is the outcome without the grayscale processing operation being performed, while a letter 601 is the outcome after the grayscale processing operation is performed. It is clearly seen that the letter 600 is somewhat jagged at the edge, while the letter 601 has a smoother edge. Therefore, through the grayscale processing operation as described above, a better effect on the subsequent imaging may be achieved.

With reference to FIG. 2 again, after a spanning rasterizer generates an output image (such as the first output image and the second output image) by the foregoing method, an image may be directly imagined on a substrate by LDI or DMD imaging techniques of an exposure device 130 (step S215).

Figure 7:
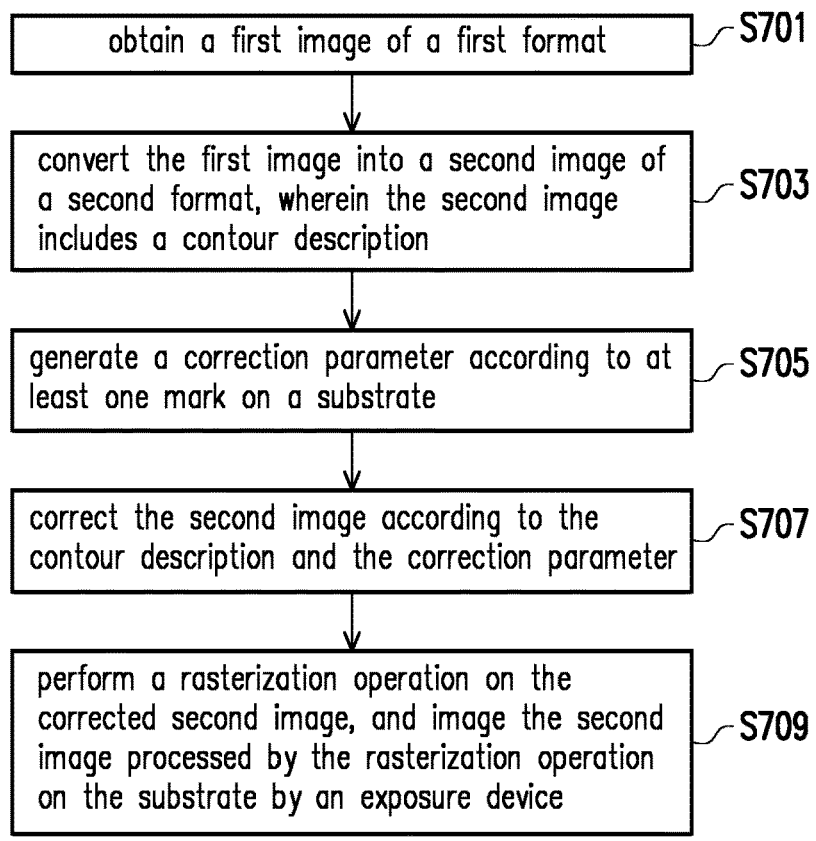
FIG. 7 is a flowchart showing a method for digital direct imaging according to an embodiment of the disclosure.

FIG. 7 is a flowchart showing a method for digital direct imaging according to an embodiment of the disclosure. With reference to FIG. 7, in step S701, an RIP workstation obtains a first image of a first format. In step S703, the RIP workstation converts the first image into a second image of a second format, wherein the second image includes a contour description. In step S705, the RIP workstation generates a correction parameter according to at least one mark on a substrate. In step S707, the RIP workstation corrects the second image according to the contour description and the correction parameter. Finally, in step S709, the RIP workstation performs a rasterization operation on the corrected second image, and images the second image processed by the rasterization operation on the substrate by an exposure device.

Figure 8:
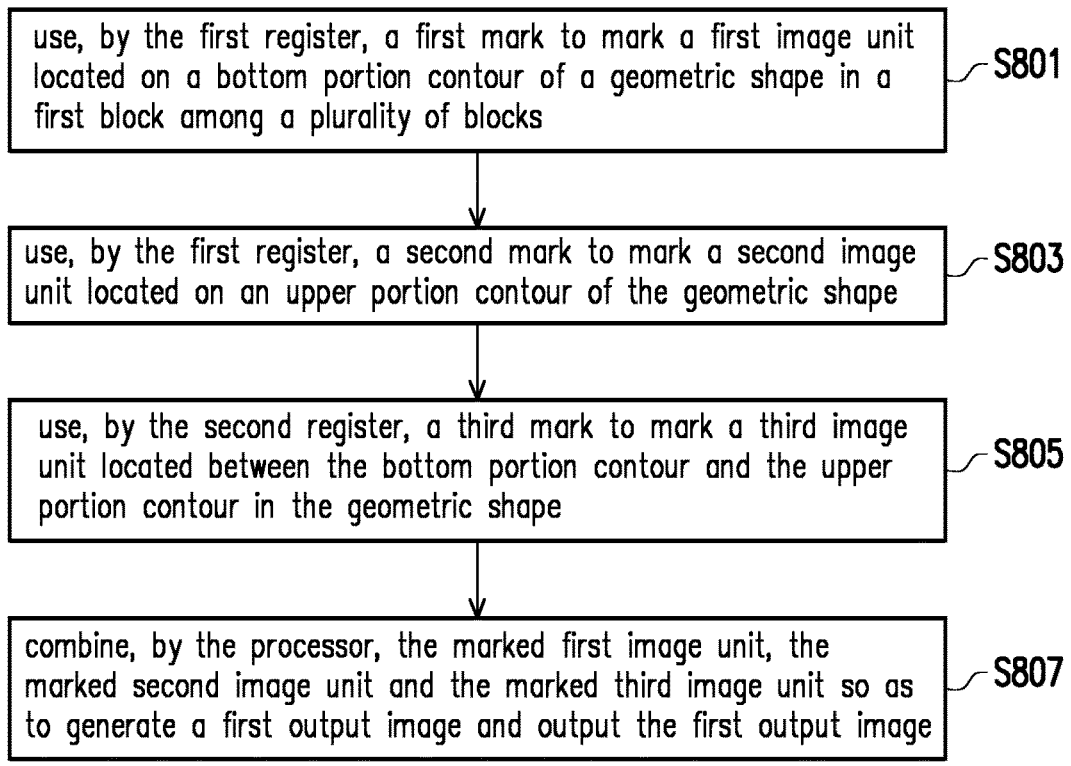
FIG. 8 is a flowchart showing a rasterized image generating method according to an embodiment of the disclosure.

FIG. 8 is a flowchart showing a rasterized image generating method according to an embodiment of the disclosure. With reference to FIG. 8, in step S801, a first register 14a in an RIP workstation uses a first mark to mark a first image unit located on a bottom portion contour of a geometric shape in a first block among a plurality of blocks. In step S803, the first register 14a in the RIP workstation uses a second mark to mark a second image unit located on an upper portion contour of the geometric shape. In step S805, a second register 14b in the RIP workstation uses a third mark to mark a third image unit located between the bottom portion contour and the upper portion contour in the geometric shape. In step S807, a processor 10 in the RIP workstation combines the marked first image unit, the marked second image unit and the marked third image unit so as to generate a first output image and output the first output image.

Figure 9:
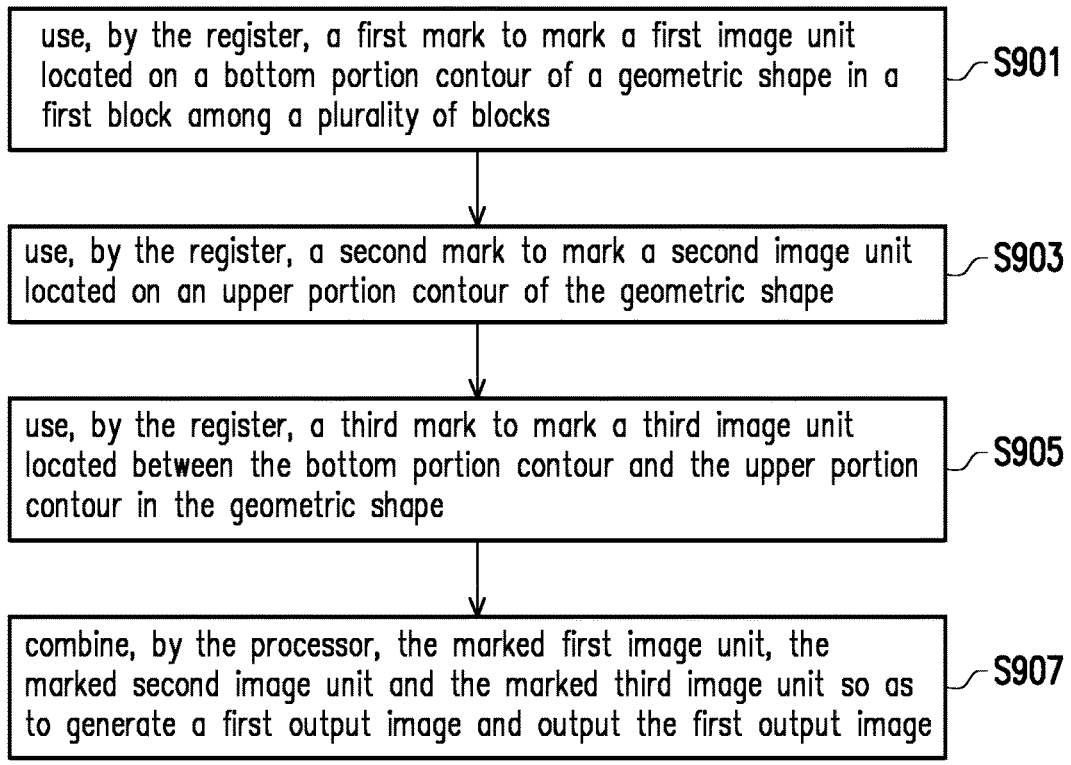
FIG. 9 is a flowchart showing a rasterized image generating method according to another embodiment of the disclosure.

FIG. 9 is a flowchart showing a rasterized image generating method according to another embodiment of the disclosure. With reference to FIG. 9, in step S901, a register in an RIP workstation uses a first mark to mark a first image unit located on a bottom portion contour of a geometric shape in a first block among a plurality of blocks. In step S903, the register in the RIP workstation uses a second mark to mark a second image unit located on an upper portion contour of the geometric shape. In step S905, the register in the RIP workstation uses a third mark to mark a third image unit located between the bottom portion contour and the upper portion contour in the geometric shape. In step S907, a processor in the RIP workstation combines the marked first image unit, the marked second image unit and the marked third image unit so as to generate a first output image and output the first output image.

In summary, the method and the system for digital direct imaging, the rasterized image generating method and the electronic device provided by this disclosure may reduce the computing load in the RIP workstation, facilitate high-resolution real-time geometric scaling/rotation correction, and solve the issue of transmission and storage of enormous data.

Although the embodiments are already disclosed as above, these embodiments should not be construed as limitations on the scope of the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for digital direct imaging, comprising:
obtaining a first image of a first format;
converting the first image into a second image of a second format, wherein the second image comprises a contour description;
generating a correction parameter according to at least one mark on a substrate, wherein generating the correction parameter according to the at least one mark on the substrate comprises:
obtaining a third image of the substrate, and determining a skewing degree of the substrate according to the at least one mark on the substrate in the third image; and
performing a geometric correction operation according to the skewing degree of the substrate so as to calculate the correction parameter;
correcting the second image according to the contour description and the correction parameter; and
performing a rasterization operation on the corrected second image and imaging the second image processed by the rasterization operation on the substrate by an exposure device.

2. The method for digital direct imaging as recited in claim 1, wherein, before generating the correction parameter according to the at least one mark on the substrate, the method comprises:
obtaining a plurality of first geometric shapes in the second image from the contour description; and
performing partition on the plurality of first geometric shapes to generate a plurality of second geometric shapes, and storing at least one reference point on a contour of the plurality of second geometric shapes.

3. The method for digital direct imaging as recited in claim 2, wherein correcting the second image according to the contour description and the correction parameter comprises:
rotating the plurality of second geometric shapes according to the at least one reference point and the correction parameter so that the second image is aligned with the substrate.

4. The method for digital direct imaging as recited in claim 3, wherein, before performing the rasterization operation on the corrected second image, the method further comprises:
performing partition on the plurality of second geometric shapes by a predetermined size to generate a plurality of blocks.

5. The method for digital direct imaging as recited in claim 4, wherein performing the rasterization operation on the corrected second image comprises:
using a fourth mark to mark a fourth image unit in a second block among the plurality of blocks;
using the fourth mark to mark a fifth image unit located in a first direction of the fourth image unit in the second block; and
using a fifth mark to mark a sixth image unit located in a second direction of the fifth image unit in the second block.

6. The method for digital direct imaging as recited in claim 4, wherein performing the rasterization operation on the corrected second image comprises:
using a first mark to mark a first image unit located on a bottom portion contour of a third geometric shape in a first block among the plurality of blocks;
using a second mark to mark a second image unit located on an upper portion contour of the third geometric shape; and
using a third mark to mark a third image unit located between the bottom portion contour and the upper portion contour in the third geometric shape.

7. The method for digital direct imaging as recited in claim 6, wherein performing the rasterization operation on the corrected second image comprises:
performing a grayscale processing operation on the first image unit and the second image unit.

8. The method for digital direct imaging as recited in claim 1, wherein, after converting the first image into the second image of the second format and before generating the correction parameter according to the at least one mark on the substrate, the method further comprises:
performing a geometric optimization operation to demarcate an overlapping area of a plurality of geometric shapes in the second image into a single geometric shape.

9. The method for digital direct imaging as recited in claim 1, wherein the first format is a Gerber file format.

10. The method for digital direct imaging as recited in claim 1, wherein the second format is a format of a geometric shape file.

11. The method for digital direct imaging as recited in claim 1, wherein the exposure device is a laser direct imaging device or a digital micromirror device.

12. A system for digital direct imaging, comprising:
an input/output device obtaining a first image of a first format;
a processor converting the first image into a second image of a second format, wherein the second image comprises a contour description,
generating a correction parameter according to at least one mark on a substrate,
correcting the second image according to the contour description and the correction parameter, and
performing a rasterization operation on the corrected second image; and
an exposure device imaging the second image processed by the rasterization operation on the substrate, wherein, when the processor generates the correction parameter according to the at least one mark on the substrate,
the input/output device obtains a third image of the substrate, the processor determines a skewing degree of the substrate according to the at least one mark on the substrate in the third image, and
the processor performs a geometric correction operation according to the skewing degree of the substrate so as to calculate the correction parameter.

13. The system for digital direct imaging as recited in claim 12, wherein, before generating the correction parameter according to the at least one mark on the substrate,
the processor obtains a plurality of first geometric shapes in the second image from the contour description, and
the processor performs partition on the plurality of first geometric shapes to generate a plurality of second geometric shapes, and stores at least one reference point on a contour of the plurality of second geometric shapes.

14. The system for digital direct imaging as recited in claim 13, wherein, when correcting the second image according to the contour description and the correction parameter,
the processor rotates the plurality of second geometric shapes according to the at least one reference point and the correction parameter so that the second image is aligned with the substrate.

15. The system for digital direct imaging as recited in claim 14, wherein, before performing the rasterization operation on the corrected second image,
the processor performs partition on the plurality of second geometric shapes by a predetermined size to generate a plurality of blocks.

16. The system for digital direct imaging as recited in claim 15, further comprising a first register and a second register, wherein, when the processor performs the rasterization operation on the corrected second image,
the first register uses a fourth mark to mark a fourth image unit in a second block among the plurality of blocks,
the first register uses the fourth mark to mark a fifth image unit located in a first direction of the fourth image unit in the second block, and
the second register uses a fifth mark to mark a sixth image unit located in a second direction of the fifth image unit in the second block.

17. The system for digital direct imaging as recited in claim 15, further comprising a first register and a second register, wherein, when the processor performs the rasterization operation on the corrected second image,
the first register uses a first mark to mark a first image unit located on a bottom portion contour of a third geometric shape in a first block among the plurality of blocks,
the first register uses a second mark to mark a second image unit located on an upper portion contour of the third geometric shape, and
the second register uses a third mark to mark a third image unit located between the bottom portion contour and the upper portion contour in the third geometric shape.

18. The system for digital direct imaging as recited in claim 17, wherein, when the processor performs the rasterization operation on the corrected second image,
the first register performs a grayscale processing operation on the first image unit and the second image unit.

19. The system for digital direct imaging as recited in claim 12, wherein, after converting the first image into the second image of the second format and before generating the correction parameter according to the at least one mark on the substrate,
the processor performs a geometric optimization operation to demarcate an overlapping area of a plurality of geometric shapes in the second image into a single geometric shape.

20. The system for digital direct imaging as recited in claim 12, wherein the first format is a Gerber file format.

21. The system for digital direct imaging as recited in claim 12, wherein the second format is a format of a geometric shape file.

22. The system for digital direct imaging as recited in claim 12, wherein the exposure device is a laser direct imaging device or a digital micromirror device.

* * * * *